(12) United States Patent
Miyazaki

(10) Patent No.: US 7,926,531 B2
(45) Date of Patent: Apr. 19, 2011

(54) PNEUMATIC TIRE

(75) Inventor: Shinichi Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 470 days.

(21) Appl. No.: 11/604,793

(22) Filed: Nov. 28, 2006

(65) Prior Publication Data

US 2007/0131334 A1   Jun. 14, 2007

(30) Foreign Application Priority Data

Dec. 13, 2005   (JP) .................... 2005-359331

(51) Int. Cl.
*B60C 9/00* (2006.01)
*B60C 9/02* (2006.01)
(52) U.S. Cl. .............. 152/451; 152/548; 152/556
(58) Field of Classification Search ............ 152/451, 152/548, 556
See application file for complete search history.

(56) References Cited

U.S. PATENT DOCUMENTS

| 5,115,854 A * | 5/1992 | Oshima et al. ............. 152/556 |
| 6,089,295 A * | 7/2000 | Komatsuki et al. ......... 152/556 |
| 6,488,065 B1 * | 12/2002 | Sato ............................ 152/539 |
| 6,883,572 B2 * | 4/2005 | Hanya ......................... 152/564 |
| 2004/0007306 A1 * | 1/2004 | Miyazaki et al. ........... 152/564 |

FOREIGN PATENT DOCUMENTS

| EP | 1 022 163 A2 | 7/2000 |
| EP | 1 338 440 A2 | 8/2003 |
| JP | 61-057404 A | 3/1986 |
| JP | 10-297211 A | 11/1998 |
| JP | 2000-177310 A | 6/2000 |
| JP | 2000-303290 A | 10/2000 |
| JP | 2003-237308 A | 8/2003 |

* cited by examiner

*Primary Examiner* — Justin Fischer
(74) *Attorney, Agent, or Firm* — Birch, Stewart, Kolasch & Birch, LLP

(57) ABSTRACT

A pneumatic tire includes a carcass ply with carcass cords. The carcass cords comprise high tenacity vinylon fiber, polyethylene naphthalate fiber or polyalylate fiber. Viscoelasticity characteristics per one cord at 120° C. of the carcass cord satisfy the following equations (1) to (3):

$$B > 0 \quad (1)$$

$$B \leq 0.0000437 \times A + 0.042857 \quad (2)$$

$$B \leq -0.00003636 \times A + 0.163636 \quad (3)$$

(wherein "A" represents a product of complex modulus E*(N/cm$^2$) and cross-sectional area "S" (cm$^2$) of cord), and "B" represents a loss tangent tanδ).

6 Claims, 2 Drawing Sheets

PNEUMATIC TIRE

BACKGROUND OF THE INVENTION

1. Field of the Invention

The present invention relates to a pneumatic tire in which both steering stability and riding comfort are enhanced by specifying viscoelasticity characteristics of a carcass cord.

2. Description of the Related Art

Conventionally, organic fiber cords such as nylon, rayon, polyethylene terephthalate (PET) and the like are widely used as a carcass cord of a pneumatic tire for a passenger car and an automatic two-wheel vehicle. Especially, the PET fiber cord is going mainstream of the carcass cord in views of tire rigidity, size stability of tire, flat spot resistance and the like. However, since modulus of the PET fiber cord at a high temperature is largely deteriorated, steering stability at the time of high speed running is poor. Further, as the performance of a vehicle is enhanced and the speed is increased, performance required for a tire becomes stricter, and in recent years, it is strongly required to further enhance the steering stability at high speed running.

In recent years, it is proposed to use a fiber cord having higher elasticity than that of the PET fiber cord as a carcass cord. However, if the elasticity of the carcass cord is increased, the tire rigidity is increased so that the steering stability at high speed running is enhanced, but there is a problem that the riding comfort is deteriorated.

SUMMARY OF THE INVENTION

Hence, based on an idea that a fiber cord having high elasticity is used as the carcass cord and the viscoelasticity characteristics at the time of high temperature is specified, it is an object of the present invention to provide a pneumatic tire capable of securing excellent riding comfort while enhancing the steering stability at the time of high speed running.

To achieve the above object, the invention of claim 1 of the application provides a pneumatic tire comprising a carcass having a carcass ply with carcass cords extending from a tread portion to a bead core of a bead portion through a sidewall portion, wherein the carcass cords are made of high tenacity vinylon fiber, polyethylene naphthalate fiber or polyalylate fiber, viscoelasticity characteristics per one cord at 120° C. satisfy the following equations (1) to (3):

$$B > 0 \quad (1)$$

$$B \leq 0.0000437 \times A + 0.042857 \quad (2)$$

$$B \leq -0.00003636 \times A + 0.163636 \quad (3)$$

(wherein "A" represents a product of complex modulus E*(N/cm$^2$) and cross-sectional area "S" (cm$^2$) of cord), and "B" represents a loss tangent tan$\delta$).

As described above, according to the invention, organic fiber cord having high elasticity and selected from high tenacity vinylon fiber, polyethylene naphthalate fiber and polyalylate fiber, is used as the carcass cord. Further, the viscoelasticity characteristics at the time of high temperature (120° C.) of the organic fiber cord are specified in a designated range. Therefore, balance between extension of the cord and resilience is optimized, and it is possible to secure excellent riding comfort while enhancing the steering stability at the time of high speed running.

DETAILED DESCRIPTION OF THE PREFERRED EMBODIMENTS

An embodiment of the present invention will be explained together with illustrated examples.

Figure 1:
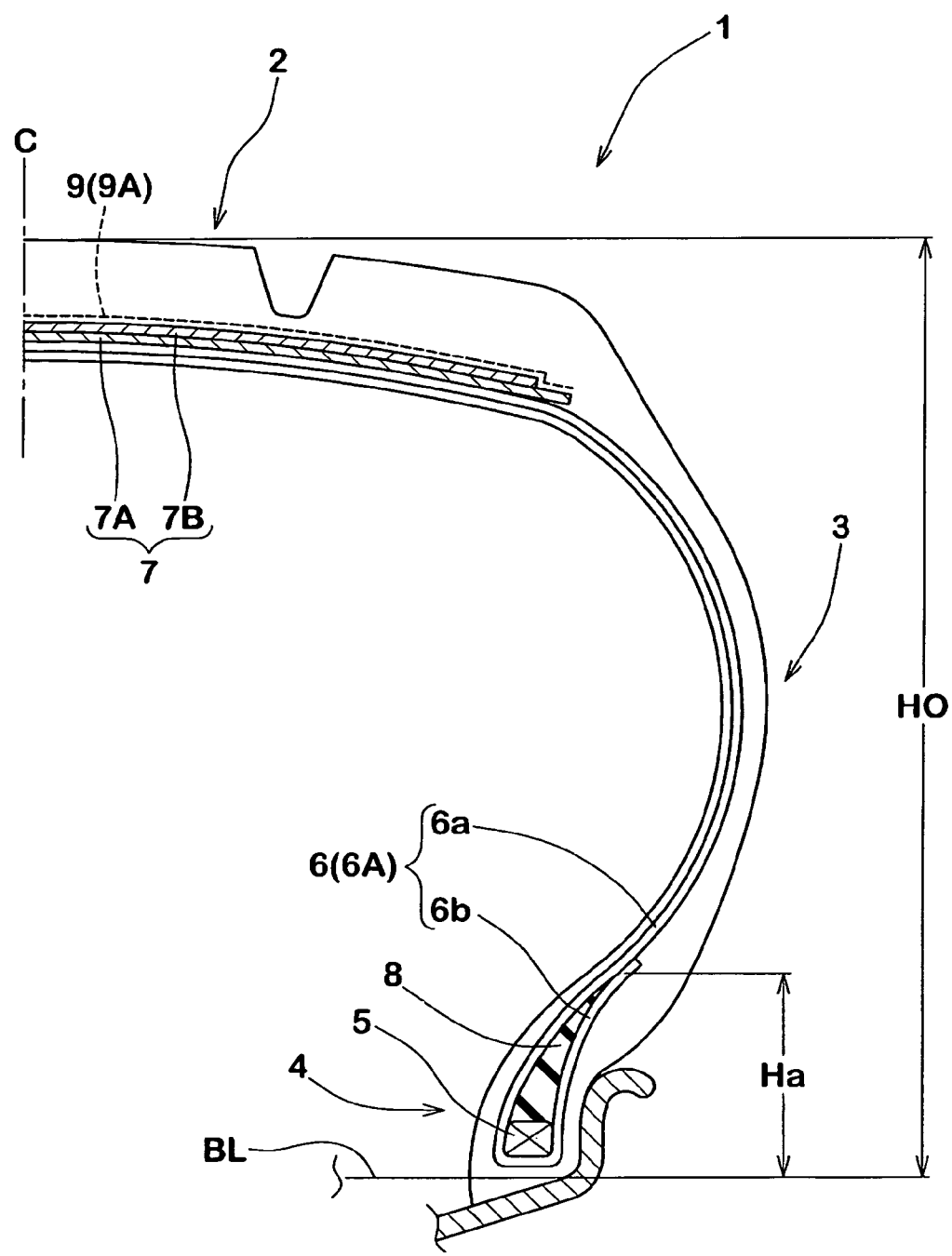
FIG. 1 is a sectional view of a pneumatic tire showing an embodiment of the present invention.

FIG. 1 is a sectional view when a pneumatic tire of the invention is a radial tire for a passenger car. As shown in FIG. 1, the pneumatic tire 1 includes a carcass 6 which extends from a tread portion 2 to a bead core 5 of a bead portion 4 through a sidewall portion 3, and a belt layer 7 disposed inside of the tread portion 2 and radially outward of the carcass 6.

The carcass 6 comprises one or more (one, in this embodiment) carcass ply 6A in which the carcass cords are disposed at an angle of 75° to 90° with respect to a circumferential direction of the tire. The carcass ply 6A includes a ply body 6a extending between the bead cores 5 and 5, and ply folded-back portions 6b connected to both sides of the ply body 6a and folded back from an inner side to an outer side in an axial direction of the tire around the bead core 5. A bead apex 8 made of hard rubber having a triangular cross section is disposed between the ply body 6a and the ply folded-back portion 6b. The bead apex 8 extends from the bead core 5 radially outward of the tire. With this, a portion of the tire from the bead portion 4 to the sidewall portion 3 is reinforced.

If the rubber hardness of the bead apex 8 is low, bead rigidity and bead endurance are insufficient, and if the rubber hardness is excessively high, riding comfort and vibration characteristics are deteriorated. From such a view-point, it is preferable that the lower limit value of the rubber hardness is 70° or higher, and more preferably 80° or higher, and the upper limit value is 95° or lower. The "rubber hardness" is hardness by a durometer type A as measured under atmosphere of temperature of 25° C. From the same point of view, a radial height Ha of an outer end of the bead apex 8 from a bead base line BL is preferably 25% or higher of a tire cross section height H0, and more preferably 30% or higher, and its upper limit value is preferably 45% or lower.

The belt layer 7 comprises a plurality of (two, in this embodiment) belt plies 7A and 7B in which belt cords having high strength such as a steel cord are disposed at an angle of 15° to 40° with respect to circumferential direction of the tire. In each of the belt plies 7A and 7B, the belt cords intersect with each other between the plies, thereby enhancing the belt rigidity, and substantially the entire width of the tread portion 2 is strongly reinforced with a hoop effect.

In this embodiment, a band layer 9 is formed radially outside of the belt layer 7 to enhance the high-speed endurance. The band layer 9 comprises a band ply 9A in which a band cord is spirally wound in the circumferential direction of the tire at an angle of 5° or less. As the band ply 9A, it is possible to use a pair of left and right edge band plies which cover only an outer end of the belt layer 7, or a full band play which covers substantially entire width of the belt layer 7. The band layer 6 is formed of solely the edge band ply or the full band ply, or a combination thereof.

Next, an organic fiber cord having high elasticity made of high tenacity vinylon fiber, polyethylene naphthalate fiber (polyethylene 2, 6 naphthalate fiber) or polyalylate fiber is employed as the carcass cord. Among the organic fiber cords having high elasticity, especially the polyethylene naphthalate fiber (polyethylene 2, 6 naphthalate fiber) is preferably used because it has appropriate rigidity and the tire steering stability and the riding comfort can easily be balanced.

The organic fiber cord having high elasticity has high tensile elastic modulus as is well known. Therefore, it has an effect to enhance the tire rigidity and steering stability. On the other hand, since the rigidity of the sidewall portion 3 is increased at the same time, there is a problem that the riding comfort is deteriorated.

Here, a tractive force that is periodically repeated at the time of running is applied to the carcass cord. The present inventor researched based on a view-point that the running performance of a tire was largely influenced by dynamic viscoelasticity characteristics rather than static characteristics of the carcass cord. More specifically, carcass cords were prototyped using various organic fiber materials, and using the carcass cords, tires for a passenger car were formed. A relation between the running performance and the viscoelasticity characteristics of the carcass cord was checked.

As a result, it was found that the steering stability and riding comfort at the time of high speed running has a strong correlation with respect to the viscoelasticity characteristics at the time of high temperature, particularly the complex modulus $E^*(N/cm^2)$ at 120° C. and loss tangent $\tan\delta$. It was found that excellent riding comfort could be secured while enhancing the steering stability at the time of high speed running by using a carcass cord which satisfied the following equations (1) to (3) when a product ($E^* \times S$) of complex modulus $E^*(N/cm^2)$ and cross-sectional area S (unit $cm^2$) of the carcass cord is defined as a variable A, and a loss tangent $\tan\delta$ of the carcass cord is defined as a variable B:

$$B>0 \tag{1}$$

$$B \leq 0.0000437 \times A + 0.042857 \tag{2}$$

$$B \leq -0.00003636 \times A + 0.163636 \tag{3}$$

Figure 2:
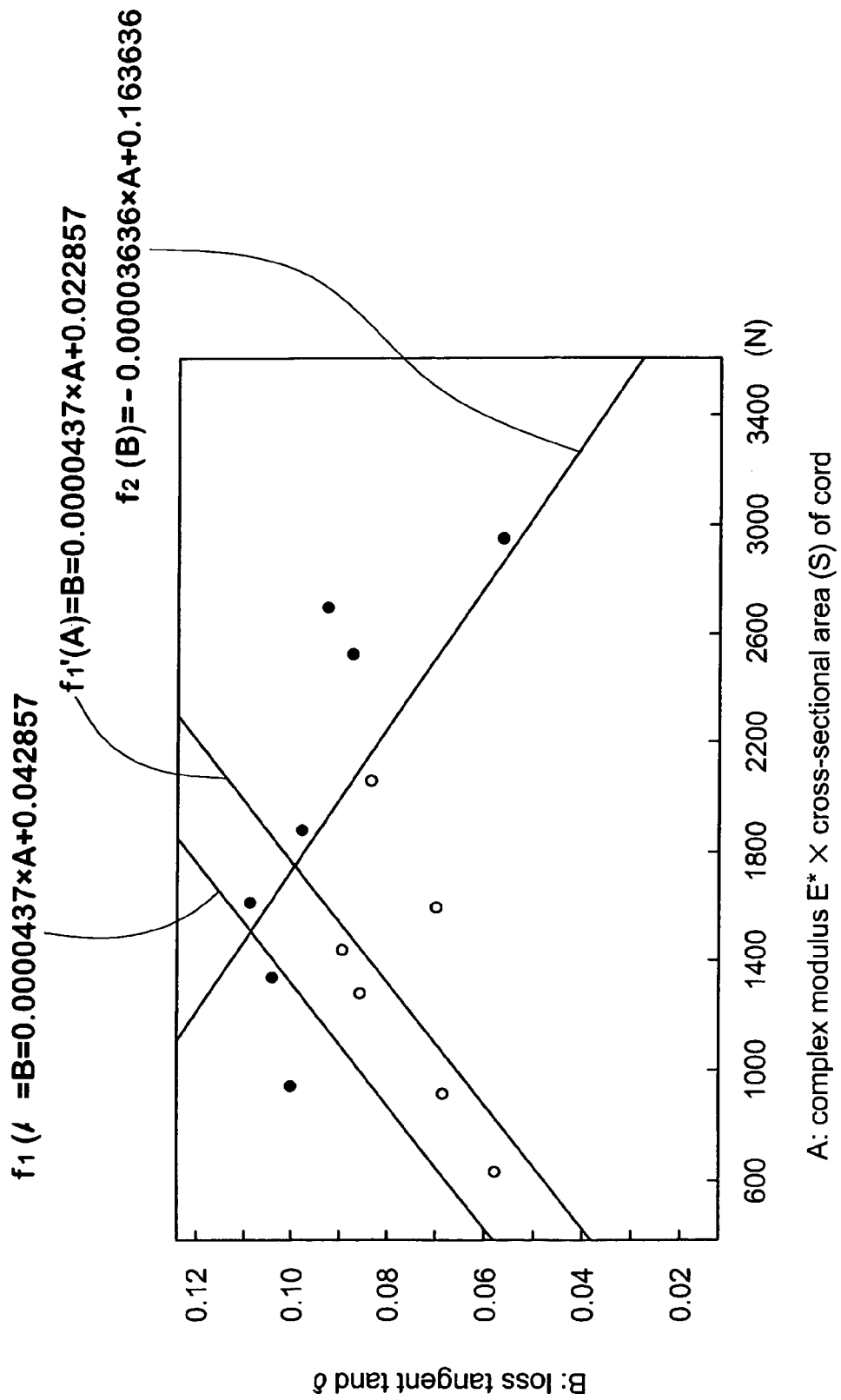
FIG. 2 is a graph used for explaining a relation between the viscoelasticity characteristics, the steering stability and the riding comfort of the carcass cord.

FIG. 2 shows a portion of a result of an experiment in the carcass cord in which steering stability and riding comfort at the time of high speed running of the prototyped tires were evaluated while a value of the variable A is shown in a horizontal axis and a value of the variable B is shown in a vertical axis. Here, ○ shows tires in which both steering stability and riding comfort were excellent, and □ shows tire in which at least one of the steering stability and riding comfort is inferior. It can be found from FIG. 2 that at least one of the steering stability and riding comfort is inferior in a region of $f1(A)>0$ exceeding a straight line $f1(A)$ of $B=0.0000437 \times A + 0.042857$, and a region exceeding of $f2(A)>0$ a straight line $f2(A)$ of $B=-0.00003636 \times A + 0.163636$.

In the experiment, PET fiber, PEN fiber (polyethylene naphthalate fiber), nylon, high tenacity vinyl on fiber, polyalylate fiber, aramid fiber, rayon were used as the organic fiber material, specifications such as thickness (fineness) of the cord, the number of twist was changed, and carcass cords in which the variables A and B were different were prototyped. Using the carcass cords, tires for a passenger car of tire size of (195/65R15) is formed, and the steering stability and riding comfort were evaluated by a driver's feeling when the vehicle actually runs on a tire test course.

Even when the carcass cords are the same, if the striking number is increased, the steering stability is enhanced (riding comfort is deteriorated). Therefore, in the actual case, in the prototyped carcass cord, prototyped tires in which the striking number M was adjusted and the steering stability was enhanced to a satisfactory reference level, the riding comfort was evaluated, and it was evaluated whether the prototyped tire was excellent in both steering stability and riding comfort. It can be confirmed from FIG. 2 that a carcass cord having viscoelasticity characteristics which satisfy the equations (1) to (3) can exhibit excellent riding comfort while enhancing the steering stability at the time of high speed running. It becomes apparent from the inventor's research that the same result can be obtained also in tires for a passenger car having different tire sizes and tires having different categories (e.g., tires for an automatic two-wheel vehicle).

It is estimated that the steering stability and riding comfort are also influenced by elongation of the carcass cord and restoration from elongation. That is, it is conceived that a carcass cord using an organic fiber having large complex modulus and high elasticity is not relatively extended easily and has excellent steering stability. When the loss tangent $\tan\delta$ is high, however, hysteresis loss when a load is released from a state where the cord is once extended and the carcass cord is restored to its original state is large. Therefore, the restoration is relatively poor, respond is deteriorated, and steering stability is deteriorated. On the other hand, even in the case of a cord in which complex modulus is low and the cord is easily extended relatively, if the loss tangent $\tan\delta$ is low, the restoration is excellent and response is quickened and thus, the steering stability can be enhanced. If the extending properties and the restoration are optimally balanced, a margin for enhancing the riding comfort is generated, and both the riding comfort and steering stability can be enhanced.

To enhance both the riding comfort and steering stability, it is preferable to satisfy the following equation (4):

$$B<0.0000437 \times A + 0.022857 \tag{4}$$

The loss tangent $\tan\delta$ which is the variable B is roughly determined by a material of the cord fiber. The product ($E^* \times S$) of complex modulus $E^*(N/cm^2)$ which is the variable A and cross-sectional area S (unit $cm^2$) of the carcass cord can be adjusted by changing specifications such as the thickness (fineness) of the cord and the number of twist.

Here, in the case of the aramid fiber, since the loss tangent $\tan\delta$ is large and the tensile elastic modulus is excessively high, even when the cord thickness is reduced and the number of twist is increased, it is difficult to obtain a cord which satisfies the equations (2) and (3).

Generally, a carcass cord having a two-ply yarn structure is used. At that time, if the number of twist n per 10 cm length of the cord (the number of upper twist and the number of lower twist are the same) is excessively large, a resistance between filaments at the time of expansion and contraction becomes excessively large, and the restoration of the cord is deteriorated. If the resistance is excessively small, the resistance against fatigue is increased and the endurance is deteriorated. Therefore, it is preferable that the upper limit of the number of twist n is 70 (/10 cm) or lower, more preferably 60 (/10 cm) or lower, and the lower limit of the number of twist is more preferably 30 (/10 cm) or higher and more preferably 35 (/10 cm) or higher. For the same reason, it is preferable that the twist coefficient T of the cord defined in the following equation (5) is in a range of 0.45 to 0.75. In the equation, n represents number of twist (/10 cm), D represents total fineness based on corrected mass (dtex) of cord, and p represents specific gravity of fiber material:

$$T = n \times \sqrt{\{(0.125 \times D/2) \times (1/\rho)\}} \times 10^{-3} \tag{5}$$

If the variable A which is the product ($E^* \times S$) of the complex modulus $E^*(N/cm^2)$ and the cross-sectional area S (unit $cm^2$) of the carcass cord is excessively large, the cord becomes hard and this is disadvantageous for enhancing the riding comfort. Therefore, the upper limit of the variable A is preferably 2000 N or less, preferably 1900 N or less and more preferably 1800 N or less. The lower limit value of the variable A is preferably 340 N or higher in view of the steering stability. It is preferable that the lower limit value of the variable B which is the loss tangent tanδ is 0.02 or higher, and more preferably 0.03 or higher. If the variable B is lower than this value, the impact moderating effect is lowered, and the response to the external force is excessively excellent, and there is a tendency that the riding comfort is deteriorated.

In the carcass cord, the carcass drag K which is the produce (A×M) of the variable A and the cord striking number M is set to preferably $2.0 \times 10^4$ to $5.0 \times 10^4$, and more preferably $2.5 \times 10^4$ to $3.8 \times 10^4$ in view of enhancing both the steering stability and riding comfort. The cord striking number M means the number of cords per 5 cm width of the carcass ply.

As a topping rubber of the carcass ply covering the carcass cord, a preferably employed rubber is one having complex modulus at 70° C. of 4.5 MPa or higher and loss tangent of 0.14 or lower. This is because that since the loss tangent of the topping rubber is small, if this is combined with a cord having relatively small loss tangent carried out in the invention, the energy loss of the tire is reduced and the steering stability is more enhanced. The fact that the complex modulus is slightly high can also enhance the steering stability. In the conventional topping rubber, complex modulus is 4.0 MPa and loss tangent is about 0.15.

Although the especially preferable embodiment of the present invention has been described in detail, the invention is not limited to the illustrated embodiment, and the invention can variously be modified and carried out.

EXAMPLES

Carcass cords were prototyped based on the specifications described in Table 1, and tires for a passenger car having tire size of 195/65R15 were formed using the carcass cords. The steering stability, stability feeling and riding comfort of the prototyped tires at the time of high speed running were tested. The specifications other than the carcass cord are the same. The complex modulus and loss tangent of the topping rubber of the carcass are values measured under the condition that the temperature is 70° C., the frequency is 10 Hz and initial distortion is 10%, and dynamic distortion is ±1%.

<Steering Stability, Stability Feeling and Riding Comfort>

The prototyped tires were mounted on all of wheels of a passenger car (2500 cc, FR vehicle) under the condition of rim (15 inches) and internal pressure (200 KPa), and the car runs on a tire test course of dry asphalt at high speed, and the steering stability, stability feeling and riding comfort were absolutely evaluated by the driver's feeling on a scale from 1 to 5.

TABLE 1

| | Comparative Example 1 | Example 1 | Example | Example 3 | Comparative Example 2 |
|---|---|---|---|---|---|
| Cord material | PET | High tenacity vinylon fiber | PEN | Vectran | Aramid |
| Configuration (dtex) | 1670 dtex/2 | 1330 dtex/2 | 1670 dtex/2 | 1670 dtex/2 | 1100 dtex/2 |
| Fineness based on corrected mass (dtex) | 3722 | 3025 | 3725 | 3815 | 2610 |
| Specific gravity of cord ρ | 1.38 | 1.28 | 1.36 | 1.40 | 1.44 |
| Cross-sectional area of cord S (cm$^2$) | 0.002697101 | 0.002363281 | 0.002738971 | 0.002725000 | 0.001812500 |
| Complex modulus E* at 120° C. (N/cm$^2$) | 367235.593 | 398360.711 | 587187.977 | 532618.055 | 1493316.08 |
| Coefficient A at 120° C. (E* × S) (N) | 990.4717 | 941.4384 | 1608.2906 | 1451.3842 | 2706.6354 |
| Coefficient B at 120° C. (tanδ) | 0.102 | 0.069 | 0.071 | 0.089 | 0.093 |
| Number of twist (upper/lower) (/10 cm) | 40/40 | 38/38 | 40/40 | 53/58 | 38/38 |
| Twist coefficient * | 0.52 | 0.46 | 0.52 | 0.69 | 0.40 |
| Striking number of cords (/5 cm) | 50 | 36 | 22 | 20 | 30 |
| Satisfaction of equation (2) | x | ○ | ○ | ○ | ○ |
| Satisfaction of equation (3) | ○ | ○ | ○ | ○ | x |
| Complex modulus (Mpa) of topping rubber | 4.0 | 5.0 | 5.0 | 5.0 | 5.0 |
| Loss tangent of topping rubber | 0.15 | 0.12 | 0.12 | 0.12 | 0.12 |
| Tire performance | | | | | |
| Steering stability | 3.7 | 4.5 | 5.0 | 4.3 | 5.0 |
| Stability feeling | 3.8 | 4.5 | 5.0 | 4.5 | 4.5 |
| Riding comfort | 3.8 | 3.9 | 4.0 | 3.9 | 3.0 |

| | Example 4 | Example 5 | Comparative Example 3 | Example 6 |
|---|---|---|---|---|

TABLE 1-continued

| Cord material | High tenacity vinylon fiber | Vectran | Aramid | PEN |
|---|---|---|---|---|
| Configuration (dtex) | 1330 dtex/2 | 1670 dtex/2 | 1100 dtex/2 | 1670 dtex/2 |
| Fineness based on corrected mass (dtex) | 3165 | 3465 | 2278 | 3725 |
| Specific gravity of cord ρ | 1.28 | 1.40 | 1.44 | 1.36 |
| Cross-sectional area of cord S (cm$^2$) | 0.002472656 | 0.002475000 | 0.001581944 | 0.002738971 |
| Complex modulus E* at 120° C. (N/cm$^2$) | 25894.39 | 550757.313 | 1617968.1 | 587187.977 |
| Coefficient A at 120° C. (E* × S) (N) | 608.0123 | 1363.1243 | 2559.5357 | 1608.2906 |
| Coefficient B at 120° C. (tanδ) | 0.058 | 0.086 | 0.090 | 0.071 |
| Number of twist (upper/lower) (/10 cm) | 60/60 | 60/60 | 60/60 | 40/40 |
| Twist coefficient * | 0.75 | 0.75 | 0.60 | 0.52 |
| Striking number of cords (/5 cm) | 36 | 36 | 36 | 22 |
| Satisfaction of equation (2) | ○ | ○ | ○ | ○ |
| Satisfaction of equation (3) | ○ | ○ | x | ○ |
| Complex modulus (Mpa) of topping rubber | 5.0 | 5.0 | 5.0 | 4.0 |
| Loss tangent of topping rubber | 0.12 | 0.12 | 0.12 | 0.15 |
| Tire performance | | | | |
| Steering stability | 4.0 | 4.0 | 4.5 | 4.5 |
| Stability feeling | 4.0 | 4.5 | 4.0 | 4.5 |
| Riding comfort | 4.0 | 4.0 | 3.5 | 4.0 |

It can be confirmed that the tires of the example can exhibit excellent riding comfort while enhancing the steering stability at the time of high speed running.

What is claimed is:

1. A pneumatic tire comprising a carcass having a carcass ply with carcass cords extending from a tread portion to a bead core of a bead portion through a sidewall portion, wherein:
   the carcass cords are made of high tenacity vinylon fiber or polyalylate fiber;
   viscoelasticity characteristics per one cord at 120° C. satisfy the following equations (1) to (3):

$$B > 0 \quad (1)$$

$$B \leq 0.0000437 \times A + 0.042857 \quad (2)$$

$$B \leq -0.00003636 \times A + 0.163636 \quad (3)$$

wherein "A" represents a product of complex modulus E*(N/cm$^2$) and cross-sectional area "S"(cm$^2$) of the cord, "A" is 340 to 1800 N, and "B" represents a loss tangent tanδ which is 0.02 or higher;
   the carcass cords have a two-ply twist structure, and the number of twists n of the cord is 30 to 70 per 10 cm; and a twist coefficient "T" of the cord defined in the following equation (5) is 0.45 to 0.75:

$$T = n \times \sqrt{\{(0.125 \times D/2) \times (1/\rho)\}} \times 10^{-3} \quad (5)$$

wherein "n" represents the number of twists per 10 cm, "D" represents total fineness based on corrected mass (dtex) of the cord, and "ρ" represents specific gravity of fiber.

2. The pneumatic tire according to claim 1, wherein the carcass cords satisfy the following equation (4):

$$B \leq 0.0000437 \times A + 0.022857 \quad (4).$$

3. The pneumatic tire according to claim 1, wherein a carcass drag, which is a product (M×A) of the number of cords "M" per 5 cm in width of the carcass ply and the variable "A", is $2.0 \times 10^4$ to $5.0 \times 10^4$ N.

4. The pneumatic tire according to claim 3, wherein the product (M×A) is $2.5 \times 10^4$ to $3.8 \times 10^4$ N.

5. The pneumatic tire according to claim 1, wherein complex modulus of a topping rubber of the carcass ply at 70° C. is 4.5 MPa or higher, and loss tangent is 0.14 or lower.

6. The pneumatic tire according to claim 1, wherein the number of twists n of cord is 35 to 60 per 10 cm.

* * * * *